United States Patent [19]

Watanabe et al.

[11] Patent Number: 4,917,742

[45] Date of Patent: Apr. 17, 1990

[54] METHOD OF MAKING LIGHTWEIGHT PANELS AND THEIR CORE MATERIALS

[75] Inventors: Yasuhiko Watanabe; Nobuyoshi Nakamura; Yoshinori Kuriyama; Takuji Motegi, all of Kitakyushu, Japan

[73] Assignee: Nippon Steel Chemical Co., Ltd., Tokyo, Japan

[21] Appl. No.: 311,565

[22] Filed: Feb. 16, 1989

[30] Foreign Application Priority Data

Feb. 17, 1988 [JP] Japan .................................. 63-32792

[51] Int. Cl.$^4$ ................................................ B32B 3/12
[52] U.S. Cl. ...................................... 156/79; 156/267; 264/46.7; 264/138; 428/117
[58] Field of Search ................... 428/117, 116, 118, 73; 156/79, 267, 335; 264/46.7, 138

[56] References Cited

U.S. PATENT DOCUMENTS

| | | | |
|---|---|---|---|
| 2,729,894 | 1/1956 | Andrews | 156/79 X |
| 3,407,110 | 10/1968 | Axelson et al. | 156/267 X |
| 3,644,158 | 2/1972 | Strumbos | 428/117 X |
| 4,330,494 | 5/1982 | Iwata et al. | 428/117 X |

FOREIGN PATENT DOCUMENTS

| | | |
|---|---|---|
| 51-842 | 3/1976 | Japan . |
| 60-72723 | 4/1985 | Japan . |
| 62-59027 | 3/1987 | Japan . |

*Primary Examiner*—Henry F. Epstein
*Attorney, Agent, or Firm*—Armstrong, Nikaido, Marmelstein, Kubovcik & Murray

[57] ABSTRACT

This invention discloses lightweight panels consisting of a honeycomb, boards on both sides, and phenolic foam of a density of 7–20 Kg/m$^3$ in the cavities of the honeycomb and a method of making a honeycomb core, with the panels characterized by being light, fireproof, fire-resistant, thermally insulating, and of high strength and useful for building panels, particularly for panels in transportation equipment.

3 Claims, No Drawings

METHOD OF MAKING LIGHTWEIGHT PANELS AND THEIR CORE MATERIALS

Field of the Invention and Related Art Statement

This invention relates to lightweight panels with honeycomb cores.

Lightweight panels with honeycomb cores have been used as building materials and as panels in vehicles, ships, and aircraft for their lightness.

The cavities of a honeycomb may advantageously be left empty in consideration of the lightness alone, but is known to be filled with cellular materials and the like in attempts to improve thermal and acoustic insulation. For example, Japan Kokai Tokkyo Koho No. 60-72,723 (1985) has described filling the honeycomb voids with cellular mixtures of phenolic resins and epoxy resins or polyurethanes. Such cellular mixtures, however, have a density of 0.03 grams per cubic centimeter or more (corresponding to 30 $Kg/m^3$ and are therefore not satisfactory from the viewpoint of lightness.

OBJECT AND SUMMARY OF THE INVENTION

An object of this invention is to provide lightweight panels.

Another object of this invention is to provide panels which are not only lightweight but also of high strength and thermally and acoustically insulating, as well as a method of making them.

The lightweight panels of this invention are constructed of a honeycomb sandwiched between boards with phenolic foam of a density of 7 to 20 $kg/m^3$ uniformly filling the cavities of the honeycomb core and are made by forming a coat, on one of the boards of a resol resin, containing a blowing agent, in a uniform thickness, positioning an open honeycomb on the coat, allowing the resin to foam freely and cure, and cutting off the overflowing phenolic foam flush with the honeycomb.

The structural materials for the honeycombs of this invention may be light metals, paper, aramid fiber sheet, and the like, and paper honeycombs or aramid honeycombs such as Nomex are most useful. Those paper or aramid honeycombs which have been impregnated with phenolic resins or the like and cured may also be used.

It is important that the phenolic foams to be used for filling the cavities of the honeycombs have a density in the range from 7 to 20 $kg/m^3$. With a density below 7 $kg/m^3$, the phenolic foams would deteriorate in strength and thermal and acoustic insulation, and at the same time become friable. On the other hand, with a density above 20 $kg/m^3$, the phenolic foams would be unlikely to meet the stringent requirements for lightness in such applications as aircraft.

The aforesaid phenolic foams may be prepared from resols or novolaks, with the former yielding lighter and less friable foams. Such resol foams may be produced by mixing resols with blowing agents, such as Freon, foam stabilizers, such as silicone surfactants and nonionic surfactants, curing agents, such as p-toluenesulfonic acid, and acid-neutralizing agents, such as zinc, and other additives and heating the mixtures at 50° to 100° C.

According to the method of this invention, resols of a low viscosity, particularly of 500 to 10,000 centipoises, are desirable. The water content in the resols should preferably be 20% or less. Preferred foam stabilizers are silicone surfactants and adducts of castor oil and ethylene oxide and they are added at a rate of 0.5 to 10 parts by weight to 100 parts by weight of the resols. As blowing agents are used aliphatic hydrocarbons, or their halogenated derivatives of a low boiling point, preferably Freon, at a rate of 15 to 90 parts by weight to 100 parts by weight of the resols. In case of using jointly Freon 11 ($CCl_3F$) and Freon 113 ($CClF_2 C Cl_2 F$), not only can cellular materials having an uniform density in whole be obtained, but the process of producing such becomes simplified, and it is desirable that the mixing ratio between Freon 11 and Freon 113 is in the range from 1:4 to 4:1. Acidic substances, preferably organic sulfonic acids such as toluenesulfonic acid and phenolsulfonic acid, may be used as curing agents at a rate of 5 to 40 parts by weight to 100 parts by weight of the resols. Zinc is effective as an acid-neutralizing agent in the cases where the boards to be pasted on one or both sides of the honeycomb are made of metals and its amount to be added varies with the amount of the curing agent used. The acid-neutralizing agent may not be required if the boards are made of acid-resistant materials such as fiber glass-reinforced plastics. In many cases, panels require excellent flame resistance. It is desirable to add a flame retardant into resols so as to improve the flame resistance of the panel. There is aluminum hydroxide as a preferred flame retardant and it is preferable to be added at a rate of 5 to 20 parts by weight of the aluminum hydroxide to 100 parts by weight of the resols. Other additives include epoxy compounds, isocyanates, polyhydric alcohols, and polysaccharides and they may be added as needed.

The filling of the honeycombs with the phenolic foams can best be performed in the following manner. A foaming composition containing a resol, a blowing agent, and other additives is applied thinly on a nonadhesive container, for example flat container, hereinafter referred to as a vat, in such a thickness as to produce foam of a desired density, an open honeycomb is positioned on the coat of the foaming composition, and the composition is allowed to foam freely and cure. It is important here that the foaming occurs in an unrestrained condition without application of pressure. When the foaming is performed under pressure, the density increases beyond the value intended by this invention. One way to perform such unrestrained foaming is to hold the honeycomb immobile with the top side kept open while in foaming. Any overflow from the top can readily be sliced off by a cutter. An overflow from the bottom, if any, may be dealt with similarly. The foaming and curing are normally completed at 50° to 100° C. in 10 to 120 minutes, followed, if necessary, by aging for 1 to 5 hours.

The honeycomb filled with the phenolic foam is covered with boards on both sides to furnish a panel. The boards to be used for this purpose are preferably fiber glass-reinforced plastics, for example phenol prepregs, (that is, fibrous materials impregnated with resin but not yet hardened), for their lightness and strength.

The lightweight panels of this invention are not only extremely light but also fireproof, heat-resistant, and thermally insulating with a resultant enhanced safety in case of fire. Furthermore, they are of such strength as to be useful for building panels, particularly for partitions and structural materials in sections requiring a maximum reduction in weight and for carts to be used on board transportation equipment such as vehicles and aircraft.

DETAILED DESCRIPTION OF THE PREFERRED EMBODIMENT

EXAMPLE 1

A foaming composition was prepared by mixing 100 parts by weight of a resol (viscosity 1,000 centipoises, water content 14% by weight), 5 parts by weight of the adducts of castor oil and ethylene oxide, 50 parts by weight of Freon 11, 20 parts by weight of p-toluenesulfonic acid, and 10 parts by weight of other additives.

The composition was then applied to a flat vat made of polycarbonate to a thickness of 1.5 mm, a paper honeycomb having a thickness of 10 mm and hexagonal cavities of about 2 mm-long sides was positioned on the coated vat and held immobile by a hollow frame placed on top as weight, the composition was allowed to foam and cure at 60° C. for 30 minutes in an oven, and the honeycomb filled with the foam was taken out and aged at 60° C. for 2 hours.

An overflow of the foam on top of the honeycomb was sliced off with a cutter. The cutting was easy to make, leaving a smooth surface.

The density of the phenolic foam produced inside the honeycomb was 14 kg/m$^3$ and the degree of powdering was 10% by weight as determined by cutting off 4 blocks (2.5×2×2 cm) from the foam, shaking them to and fro in a polyethylene bag for 15 minutes, and weighing the powders generated. The honeycomb was filled with the foam in such uniformity as to permit no light to pass through when held to the light. Moreover, improvements in strength and thermal and acoustic insulation were noted.

A panel prepared by bonding and curing glass fiber-phenolic resin prepreg sheets with a thickness of about 1 mm to both sides of the aforesaid honeycomb provided further improvements in strength and thermal and acoustic insulation.

COMPARATIVE EXAMPL

In the same method as in Example 1, a board made of polycarbonate was placed on the paper honeycomb, so as to close up upper opening thereof, and the composition was allowed to foam and cure for 30 minutes in the oven. The honeycomb was non-uniforming filled with foam.

EXAMPLE 2

A foaming composition was prepared by mixing 100 parts by weight of resol (viscosity: 1,000 centipoises, water content: 14% by weight), 5 parts by weight of the adducts of castor oil and ethylene oxide, 50 parts by weight of Freon 11, and 20 parts by weight of p-toluenesulfonic acid.

A honeycomb filled with phenolic foam was obtained as in Example 1 except for using the above composition and using an aramid honeycomb (SAH, a product of Showa Hikoki Kogyo Co., Ltd.) instead of the paper honeycomb. The density of the phenolic foam was 14 kg/m$^3$. The results are shown below.

|  | Crushing Strength (kg/cm$^2$) | Thermal Conductivity (direction of thickness) (Kcal/m.h.) |
| --- | --- | --- |
| The honeycomb with phenolic foam | 26 | 0.0402 |
| The honeycomb without phenolic foam | 20 | 0.0497 |

EXAMPLE 3

A honeycomb filled with phenolic foam was obtained as in Example 2 except for adding aluminum hydroxide into the foaming compositions of Example 2. The density of the phenolic foam was 14 kg/m$^3$. Panels wee prepared, by bonding and curing glass fiber-phenolic resin prepreg sheets with a thickness of about 1 mm to both sides of each honeycomb obtained Example 3 and Example 2 respectively. Heat Release Rate Tests (OSU Test besed on FAA Technical Standard) were carried out on these panels. The results are shown below.

| Honeycomb | Heat Release Rate Test (Kw.min./m$^2$) | |
| --- | --- | --- |
|  | Total | Peak |
| Example 3 | 33 | 39 |
| Example 2 | 38 | 90.4 |

EXAMPLE 4

A foaming composition was prepared by mixing 100 parts by weight of resol (viscosity: 1,000 centipoises, water content: 14% by weight), 5 parts by weight of the adducts of castor oil and ethylene oxide, 10 parts by weight of p-toluenesulfonic acid, 10 parts by weight of aluminum hydroxide and 65 parts by weight of Freon 11 (CCl$_3$F) and Freon 113 (CClF$_2$C Cl$_2$F).

The foaming composition was then applied to a flat vat to a thickness of 2 mm, a three-tiered paper honeycomb (each paper honeycomb had a thickness of 10 mm and hexagonal cavities of about 2 mm-long sides) was positioned on the coated vat and held immobile by a hollow frame placed on top as weight. The composition was allowed to foam and cure at 60° C. or at 100° C. for 30 minutes in the oven, and the honeycomb filled with the foam was taken out and aged at 60° c. for 2 hours.

An overflow of the foam on top of the three-tiered paper honeycomb was sliced off with the cutter. The cutting was easy to make, leaving a smooth surface. Further, each of the three-tiered paper honeycombs was cut off. The density of the phenolic foam in each honeycomb is shown below.

| Freon 11/Freon 113 (wt/wt) | | 1/0 | 1/0 | 1/1 | 1/1 | 1/3 |
| --- | --- | --- | --- | --- | --- | --- |
| Oven Temperature (°C.) | | 60 | 100 | 60 | 100 | 100 |
| Density (Kg/m$^3$) | Top Honeycomb | 16.7 | 17.1 | 13.4 | 11.8 | 14.6 |
|  | Middle Honeycomb | 13.9 | 14.6 | 11.0 | 9.2 | 10.8 |
|  | Bottom honeycomb | 11.9 | 11.8 | 11.1 | 8.6 | 8.9 |

What is claimed is:

1. A method of making a core for a lightweight panel which comprises applying a resol resin having a viscosity of about 500 to 10,000 centipoises and a water content of about 20% or less containing about 15 to 90 parts by weight of a blowing agent to 100 parts by weight of said resin, about 0.5 to 10 parts by weight of a foam stabilizer to 100 parts by weight of said resins and about 5 to 40 parts by weight of an acidic substance to 100 parts by weight of said resin on an interior surface of a substantially non-adhesive flat container in a substantially uniform thickness, positioning a honeycomb open at top and bottom on said resin, allowing said resin to foam freely and cure at a temperature of about 50° to 100° C. so as to obtain phenolic foam having a density of 7 to 20 kg/m$^3$, and cutting off any overflow of the phenolic foam.

2. The method of claim 1, wherein the resol resin contains 5 to 20 parts by weight of aluminum hydroxide, as a flame retardant, to 100 parts by weight of said resin.

3. A method of making a lightweight panel which comprises applying a resol resin having viscosity of 500 to 10,000 centipoises and a water content of 20% or less, containing 15 to 90 parts by weight of a blowing agent to 100 parts by weight of said resin, 0.5 to 10 parts by weight of a foam stabilizer to 100 parts by weight of said resin and 5 to 40 parts by weight of an acidic substance to 100 parts by weight of said resin on the interior of a non-adhesive flat container in an uniform thickness, positioning a honeycomb, open at top and bottom, on the resin, allowing the resin to foam freely and cure at a temperature of 50° to 100° C. for a period of 10 to 120 minutes, so as to obtain a phenolic foam having a density of 7 to 20 kg/m$^3$, cutting off any overflow of the phenolic foam, and covering said honeycomb filled with said phenolic foam with fiber glass-reinforced plastic boards on both sides.

* * * * *